US012649103B2

(12) United States Patent
Zhang et al.

(10) Patent No.: US 12,649,103 B2
(45) Date of Patent: Jun. 9, 2026

(54) GAME CHARACTER MOVING STATE SWITCHING METHOD AND APPARATUS, DEVICE, AND STORAGE MEDIUM

(71) Applicant: NETEASE (HANGZHOU) NETWORK CO., LTD., Hangzhou (CN)

(72) Inventors: Hanyue Zhang, Hangzhou (CN); Zhiyi Zhang, Hangzhou (CN); Xiang Lin, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 248 days.

(21) Appl. No.: 18/281,834

(22) PCT Filed: Mar. 16, 2022

(86) PCT No.: PCT/CN2022/081238
§ 371 (c)(1),
(2) Date: Sep. 13, 2023

(87) PCT Pub. No.: WO2022/267570
PCT Pub. Date: Dec. 29, 2022

(65) Prior Publication Data
US 2024/0165501 A1    May 23, 2024

(30) Foreign Application Priority Data

Jun. 25, 2021    (CN) .......................... 202110713591.7

(51) Int. Cl.
*A63F 13/2145* (2014.01)
*A63F 13/56* (2014.01)

(52) U.S. Cl.
CPC .......... *A63F 13/2145* (2014.09); *A63F 13/56* (2014.09)

(58) Field of Classification Search
CPC .......................... A63F 13/428; A63F 13/2145
See application file for complete search history.

(56) References Cited

U.S. PATENT DOCUMENTS

2014/0221094 A1    8/2014  Fujioka et al.
2022/0168656 A1*   6/2022  Liu ......................... A63F 13/55
(Continued)

FOREIGN PATENT DOCUMENTS

CN        106951178 A      7/2017
CN        110270086 A      9/2019
(Continued)

OTHER PUBLICATIONS

International Search Report and Written Opinion with regard to PCT/CN2022/081238 mailed Jun. 14, 2022.
(Continued)

*Primary Examiner* — Eugene L Kim
(74) *Attorney, Agent, or Firm* — BCF LLP

(57)                ABSTRACT

A game character moving state switching method and apparatus, a device, and a storage medium are provided. The method includes: controlling a virtual character to move according to a first moving state corresponding to the first controlling region, in response to a touching operation applied to the first controlling region; controlling the virtual character to move according to the second moving state corresponding to the second controlling region, in response to a touching operation applied to the second controlling region; and controlling the virtual character to move according to a moving state corresponding to one of the controlling regions where an operating point of the touching operation is located before entering the adjusting region, in response to a touching operation applied to the adjusting region.

19 Claims, 5 Drawing Sheets

(56)  References Cited

U.S. PATENT DOCUMENTS

2024/0100416 A1*  3/2024  Wang .................... A63F 13/426
2024/0335752 A1*  10/2024  Liu ........................ A63F 13/24

FOREIGN PATENT DOCUMENTS

| | | | |
|----|-------------|---|--------|
| CN | 111228810 A | | 6/2020 |
| CN | 112933591 A | | 6/2021 |
| CN | 113332703 A | | 9/2021 |

OTHER PUBLICATIONS

English Abstract for CN113332703 retrieved on Espacenet on Sep. 6, 2023.
English Abstract for CN106951178 retrieved on Espacenet on Sep. 6, 2023.
English Abstract for CN111228810 retrieved on Espacenet on Sep. 6, 2023.
English Abstract for CN112933591 retrieved on Espacenet on Sep. 6, 2023.
English Abstract for CN110270086 retrieved on Espacenet on Sep. 6, 2023.

* cited by examiner

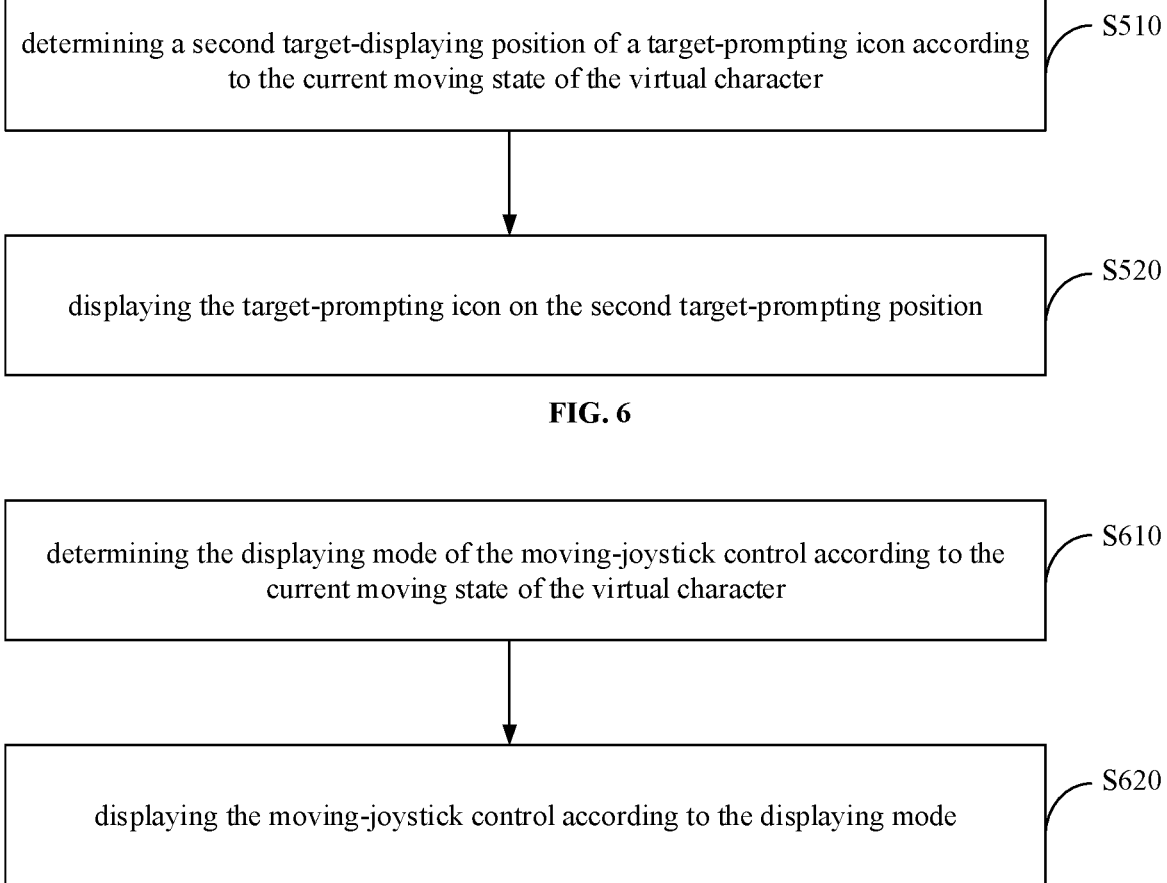

determining a second target-displaying position of a target-prompting icon according to the current moving state of the virtual character — S510 displaying the target-prompting icon on the second target-prompting position — S520

FIG. 6 determining the displaying mode of the moving-joystick control according to the current moving state of the virtual character — S610 displaying the moving-joystick control according to the displaying mode — S620

FIG. 7

GAME CHARACTER MOVING STATE SWITCHING METHOD AND APPARATUS, DEVICE, AND STORAGE MEDIUM

CROSS-REFERENCE TO RELEVANT APPLICATIONS

The present disclosure is the U.S. National Stage Application of PCT International Application NO. PCT/CN2022/081238, filed on Mar. 16, 2022 which is based on and claims the priority to the Chinese patent application with the application number 202110713591.7, filed on Jun. 25, 2021, entitled "GAME CHARACTER MOVING STATE SWITCHING METHOD AND APPARATUS, DEVICE AND STORAGE MEDIUM", the entire contents of both of which are incorporated by reference herein for all purpose.

TECHNICAL FIELD

The present disclosure relates to the technical field of game character controlling, and particularly, to a game character moving state switching method, apparatus, device and storage medium.

BACKGROUND

The corresponding direction control is usually set in the game, which can be in a form of a joystick. The user can click on the touching point of the joystick to achieve control of the movement of the virtual characters. Two moving states of walking and running are set together on the same control, where it represents the state of walking when operating in the first scope of the control; and it represents the state of running when operating in the second scope of the control. The first scope and the second scope mentioned above are adjacent to each other, which can lead to the incorrect operations of players, so as to affect their operating experiences.

SUMMARY

A first aspect of the present disclosure provides a game character moving state switching method, including controlling, by a terminal, a virtual character to move according to a first moving state corresponding to a first controlling region, in response to a touching operation applied to the first controlling region, where a graphical user interface is provided by the terminal, the graphical user interface includes a movement-controlling region, the movement-controlling region includes controlling regions and an adjusting region, the controlling regions include the first controlling region and at least one second controlling region, the first controlling region is provided in the first moving state, and the at least one second controlling region is provided in a second moving state; controlling, by the terminal, the virtual character to move according to the second moving state corresponding to the at least one second controlling region, in response to a touching operation applied to the at least one second controlling region; and in response to the touching operation applied to the adjusting region, controlling the virtual character to move according to a moving state corresponding to one of the controlling regions where an operating point of a touching operation applied to the adjusting region is located before entering the adjusting region.

A second aspect of the present disclosure provides a computer device, which includes a memory and a processor, where the memory stores computer programs that are capable to be run on the processor, and the processor is configured to execute the computer programs, to implement steps of a game character moving state switching method, where the method includes: controlling a virtual character to move according to a first moving state corresponding to a first controlling region, in response to a touching operation applied to the first controlling region, where a graphical user interface is provided by the computer device, the graphical user interface includes a movement-controlling region, the movement-controlling region includes controlling regions and an adjusting region, the controlling regions include the first controlling region and at least one second controlling region, the first controlling region is provided in the first moving state, and the at least one second controlling region is provided in a second moving state; controlling the virtual character to move according to the second moving state corresponding to the at least one second controlling region, in response to a touching operation applied to the at least one second controlling region; and in response to the touching operation applied to the adjusting region, controlling the virtual character to move according to a moving state corresponding to one of the controlling regions where an operating point of a touching operation applied to the adjusting region is located before entering the adjusting region.

A third aspect of the present disclosure further provides a non-transitory computer-readable storage medium, where the storage medium stores computer programs, and the computer programs, when executed by a processor, implement steps of a game character moving state switching method, where the method includes: controlling a virtual character to move according to a first moving state corresponding to a first controlling region, in response to a touching operation applied to the first controlling region, where a graphical user interface is provided by a terminal, the graphical user interface includes a movement-controlling region, the movement-controlling region includes controlling regions and an adjusting region, the controlling regions include the first controlling region and at least one second controlling region, the first controlling region is provided in the first moving state, and the at least one second controlling region is provided in a second moving state; controlling the virtual character to move according to the second moving state corresponding to the at least one second controlling region, in response to a touching operation applied to the at least one second controlling region; and in response to the touching operation applied to the adjusting region, controlling the virtual character to move according to a moving state corresponding to one of the controlling regions where an operating point of a touching operation applied to the adjusting region is located before entering the adjusting region.

BRIEF DESCRIPTION OF DRAWINGS

In order to more clearly explain the technical solution in the embodiments of the present disclosure, the following will briefly introduce the drawings required to be used in the embodiments. It should be understood that the following drawings only illustrate some embodiments of the present disclosure and should not be regarded as a limitation of the scope. For ordinary people skilled in this filed, they can also obtain other relevant drawings according to these drawings without paying any creative work.

FIG. 6 is a schematic flow chart of the game character moving state switching method provided by one or more embodiments of the present disclosure;

FIG. 7 is a schematic flow chart of the game character moving state switching method provided by one or more embodiments of the present disclosure;

DETAILED DESCRIPTION

In order to make the object, technical solutions and advantages of the embodiments of the present disclosure clearer, the following content will combine the figures of the embodiments of the present disclosure, to clearly and completely describe the technical solution in the embodiments of the present disclosure. Obviously, the embodiments described are part of the embodiments of the present disclosure, not all of the embodiments. Typically, the components of the embodiments of the present disclosure described and illustrated in the figures can be arranged and designed in various configurations.

Therefore, the following detailed description of the embodiments of the present disclosure provided in the figures is not intended to limit the claimed protection scope of the present disclosure, but only represents the selected embodiments of the present disclosure. On the basis of the embodiments of the present disclosure, all other embodiments obtained by ordinary people skilled in this field without paying creative work fall within the protection scope of the present disclosure.

It should be noted that similar reference signs and letters in the following drawings represent similar terms. Therefore, once an item is defined in one figure, it does not need to be further defined and explained in subsequent figures.

In the description of the present disclosure, it needs to explain that the terms "first", "second", "third" etc., are used only to distinguish descriptions and cannot be understood as indicating or implying importance in relativity.

It should be noted that the game character moving state switching method, apparatus, device and storage medium provided by the embodiments of the present disclosure can be particularly applied to games with a higher demand for the details of the movement of virtual characters. For example, when a player controls a virtual character to switch a moving state, it can produce a corresponding sound, action and other related factors in the game. Therefore, when the player is switching the moving state, it is necessary to pay attention to the environment where the virtual character is located, if the state switching of the virtual character is triggered due to incorrect operations or other reasons, it can cause other players or preset characters in the game to find the position of the virtual character or other factors, resulting in that the virtual character is attacked or damaged, so that the operation experiences in the game is reduced for the player operating the virtual character.

The game character moving state switching method, apparatus, device and storage medium provided by embodiments of the present disclosure may reduce the incorrect operations of players, and thus may improve their operating experiences.

A specific schematic relationship of a graphical user interface provided by the embodiments of the present disclosure is explained in detail below.

Figure 1:
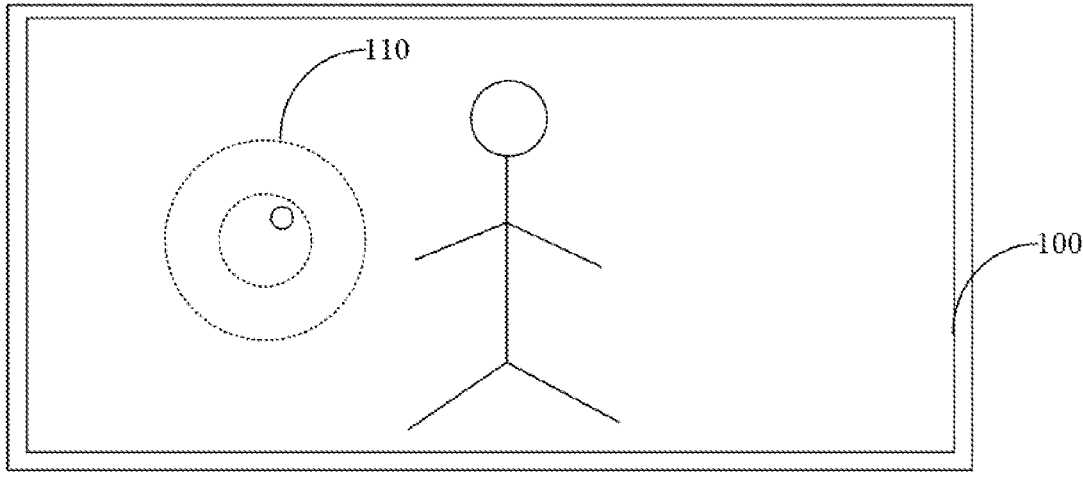
FIG. 1 is a schematic displaying diagram of a graphical user interface provided by one or more embodiments of the present disclosure.

FIG. 1 is a schematic displaying diagram of a graphical user interface provided by the embodiments of the present disclosure. Referring to FIG. 1, a graphical user interface 100 is provided by a terminal, and the graphical user interface is provided with a movement-controlling region 110.

In the above, the terminal can be specifically a mobile phone, a tablet computer, a computer, a game machine, and other electronic terminals, which is not limited specifically herein. The graphical user interface 100 can be an interface in a pre-downloaded application program in the terminal or on a page that can be accessed, such as an interactive interface of the game and so forth. A plurality of controls may be set in the graphical user interface. The player can achieve relevant control of the virtual character in the game by interacting with control(s) in the graphical user interface 100.

In some examples, the movement-controlling region 110 can be one interactive region in the graphical user interface 100, and the region can be composed of an interactive component. For example, it can be a virtual joystick control.

In some examples, the player can achieve control of the moving state of the virtual character through relevant operations in the movement-controlling region 110.

Sub-regions included in the movement-controlling region provided by the embodiments of the present disclosure and their relevant roles are explained in detail below.

Figure 2:
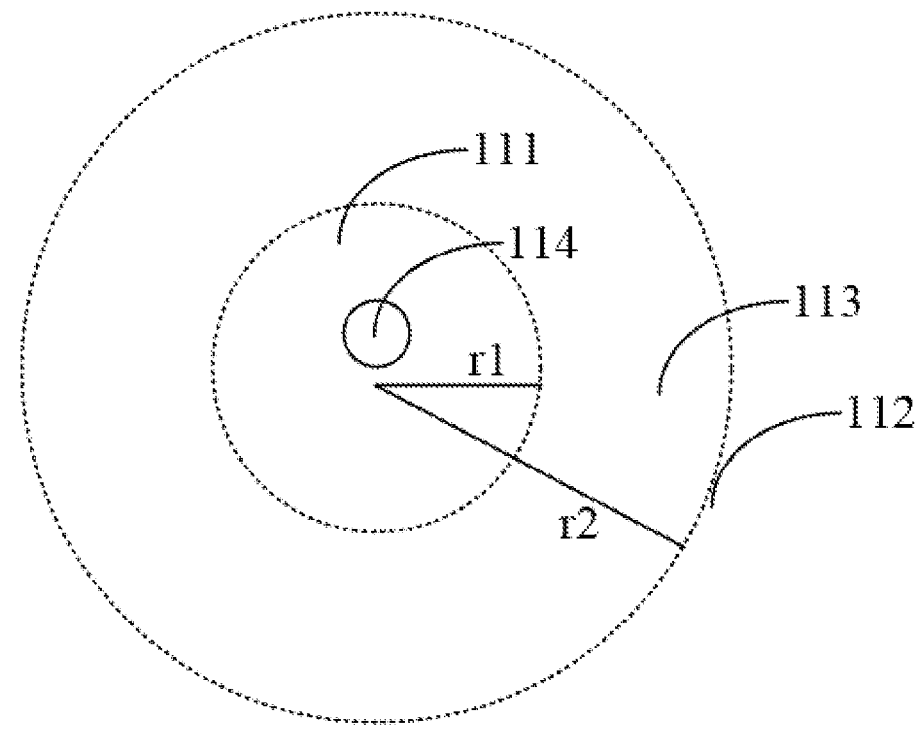
FIG. 2 is a schematic displaying diagram of a movement-controlling region provided by one or more embodiments of the present disclosure.

FIG. 2 is a schematic displaying diagram of a movement-controlling region provided by the embodiments of the present disclosure. Referring to FIG. 2, the movement-controlling region is provided with controlling regions and an adjusting region, where the controlling regions include a first controlling region and at least one second controlling region, the first controlling region is provided in a first moving state, and the second controlling region is provided in a second moving state.

In some examples, the movement-controlling region can include a first controlling region 111, at least one second controlling region 112 (one second controlling region is taken as an example in FIG. 2, and different numbers of second controlling regions can be set according to practical demands in practical applications) and an adjusting region 113.

In the above, the adjusting region 113 can be provided between the first controlling region 111 and the second controlling region 112.

In some examples, the first controlling region 111 can be a circular, elliptical, or arbitrary ring-shaped operable region, the adjusting region 113 can be a ring-shaped operable region provided around the first control region 111, the second controlling region 112 can be a ring-shaped operable region provided around the adjusting region 113. If there are a plurality of second controlling regions 112, a plurality of ring-shaped operable regions can be provided as extending outwardly in sequence, which is not limited specifically herein.

In some examples, an operating point 114 of a touching operation can be set in the movement-controlling region, the operating point 114 can be embodied as a circular pattern or a pattern in other preset shape, and it can be displayed following a player's trigger position in the movement-controlling region, or displayed according to a preset display rule, which is not limited specifically herein.

In some examples, the player can perform a triggering operation on the movement-controlling region by arbitrary modes such as clicking, dragging, long pressing and so forth.

In some examples, circular and ring-shaped sub-regions are taken as examples in FIG. 2. For example, the first controlling region 111 can be within a circular scope with a radius r1, the adjusting region 113 can be within a ring-shaped scope with a radius r2-r1, and the second controlling region 112 can be a region outside a circle with a radius r2.

In some examples, a virtual character can have a plurality of moving states, and each of the controlling regions in the movement-controlling region can be provided in (set with) a moving state correspondingly. For example, it can be set that the moving state corresponding to the first controlling region is a first moving state, the first moving state being a state of walking, and it can be set that the moving state corresponding to the second controlling region is a second moving state, the second moving state being a state of running.

It should be noted that, the moving states mentioned above are only examples, they can also be different according to different game scenes or demands of players. For example, a moving state such as flying, swimming, jumping and so forth can also be set. If there is a plurality of the second controlling regions, the moving state corresponding to each of the second controlling regions can be different, and it can be set according to the practical demands, which is not limited specifically herein.

A specific implementation process of the game character moving state switching method provided by the embodiments of the present disclosure will be specifically explained below.

Figure 3:
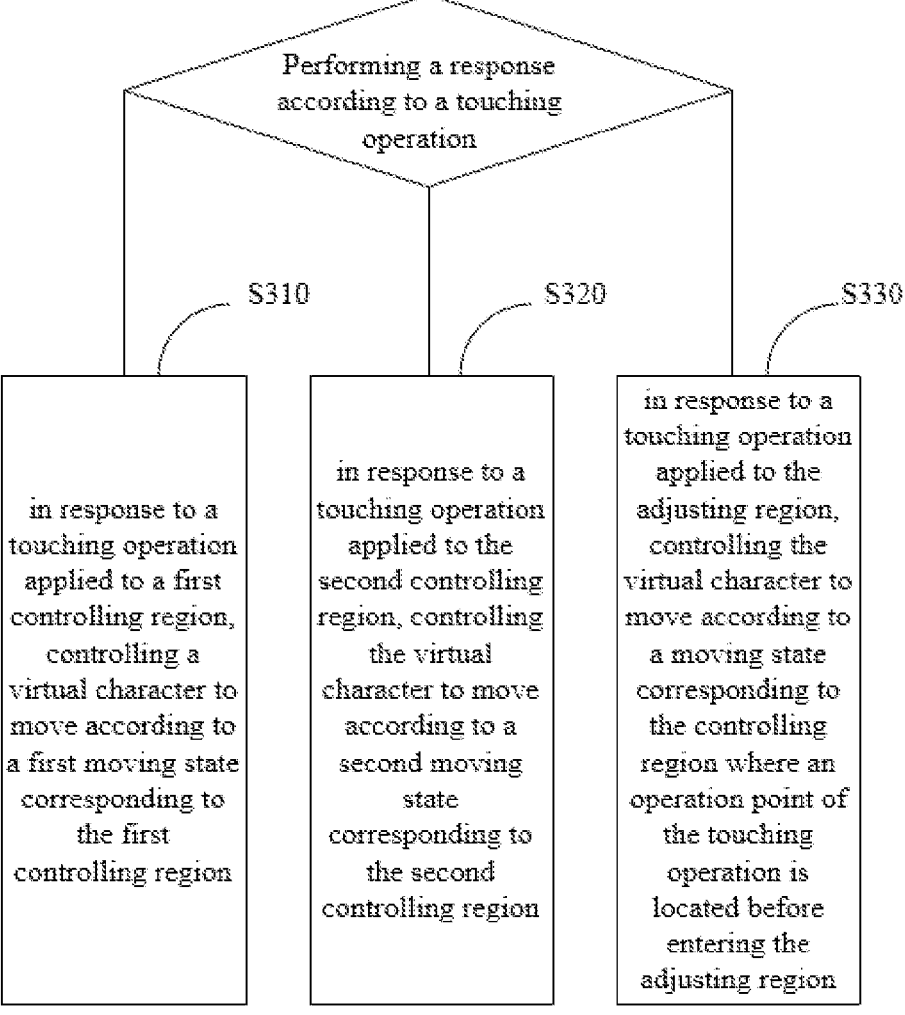
FIG. 3 is a schematic flow chart of a game character moving state switching method provided by one or more embodiments of the present disclosure.

FIG. 3 is the first schematic flow chart of a game character moving state switching method provided by the embodiments of the present disclosure. Referring to FIG. 3, the method includes:

S310: controlling a virtual character to move according to a first moving state corresponding to a first controlling region, in response to a touching operation applied to the first controlling region.

In some examples, a corresponding response can be performed by a terminal according to a specific touching operation of a player, and the response mode is also different according to different region corresponding to the touching operation.

In some examples, when the player performs the touching operation on the first controlling region, the terminal can control the virtual character to move according to the first moving state corresponding to the first controlling region, in response to the operation. For example: if the first moving state is the state of walking, the virtual character may be controlled to walk, where in the process of walking, the specific direction of walking can be determined by the specific position of the touching operation in the first controlling region. For example, if the first controlling region is in a shape a circle, the specific direction of the first moving state can be determined according to the relative position of the touching operation in the circle.

In some examples, the specific walking speed and distance can also be set according to the practical demands. For example, a walking distance per triggering operation can be set. The specific setting mode can be adapted according to different gameplays, which is not limited specifically herein.

S320: controlling the virtual character to move according to a second moving state corresponding to the second controlling region, in response to a touching operation applied to the second controlling region.

In some examples, when the player performs the touching operation on the second controlling region, the terminal can control the virtual character to move according to the second moving state corresponding to the second controlling region, in response to the operation. For example, if the second moving state is the state of running, the virtual character is controlled to run, where in the process of running, the specific direction of running can be determined by the specific position of the touching operation in the second controlling region. For example, if the second controlling region is in a ring shape, the specific direction of the second moving state can be determined according to the relative position of the touching operation in the ring shape.

S330: controlling the virtual character to move according to a moving state corresponding to the controlling region where an operation point of a touching operation applied to the adjusting region is located before entering the adjusting region, in response to the touching operation applied to the adjusting region.

In some examples, when the player performs the touching operation on the adjusting region, the terminal can control the virtual character to move according to the moving state corresponding to the controlling region where the operating point of the touching operation is located before entering the adjusting region, in response to the operation. For example, if the moving state corresponding to the controlling region where the operating point of the touching operation is located before entering the adjusting region is the state of walking, the virtual character may be controlled to walk; and if the moving state corresponding to the controlling region where the operating point of the touching operation is located before entering the adjusting region is the state of running, the virtual character may be controlled to run, which is not limited specifically herein.

In some examples, the step of controlling the virtual character to move according to the moving state corresponding to the controlling region where the operating point of a touching operation applied to the adjusting region is located before entering the adjusting region in response to the touching operation applied to the adjusting region at least includes one of the following steps: when the moving state corresponding to the controlling region where the operating point of the touching operation is located before entering the adjusting region is the first moving state, the virtual character is controlled to move in the first moving state; and when the moving state corresponding to the controlling region where the operating point of the touching operation is located before entering the adjusting region is the second moving state, the virtual character is controlled to move in the second moving state.

In some examples, if the moving state corresponding to the controlling region where the operating point of the touching operation is located before entering the adjusting region is the first moving state, that is, the walking process mentioned above, the virtual character may be controlled to move in the state of walking; and if the moving state corresponding to the controlling region where the operating point of the touching operation is located before entering the adjusting region is the second moving state, that is, the running process mentioned above, the virtual character may be controlled to move in the state of running.

In some examples, if the operating point of the touching operation does not pass by the controlling region before entering the adjustment region, the virtual character can be controlled to keep a static state unchanged.

In some examples, when the player performs the touching operation on the movement-controlling region, it can be clicking in sequence, or it can be a long pressing and dragging. For example, if it is clicking in sequence, the region where the first clicking is located is the controlling region where the operating point of the touching operation mentioned above is before entering the adjusting region, and the region where the second clicking is located is the adjusting region mentioned above. If it is a long pressing and dragging, the region where the starting position of the long pressing is located is the controlling region where the operating point of the touching operation mentioned above is before entering the adjusting region, and the region where the ending position of the long pressing is located is the adjusting region mentioned above.

In some examples, in addition to the modes of the touching operation mentioned above, other controlling modes such as a keyboard, a gamepad, etc. can also be set. The settings mentioned above can be made according to the practical demands, which is not limited herein.

In the game character moving state switching method provided by the embodiments of the present disclosure, in response to the touching operation applied to the first controlling region, the virtual character is controlled to move according to the first moving state corresponding to the first controlling region; in response to the touching operation applied to the second controlling region, the virtual character is controlled to move according to the second moving state corresponding to the second controlling region; and in response to the touching operation applied to the adjusting region, the virtual character is controlled to move according to the moving state corresponding to the controlling region where an operating point of the touching operation is located before entering the adjusting region. In the above, it can control the virtual character to move as remaining in the previous moving state by the triggering operation applied to the adjusting region, avoids the changing of the moving state caused by the incorrect touching of the player or other factors triggering the first controlling region and the second controlling region, so as to improve the operation experiences of the players.

In some examples, the controlling regions and the adjusting region are determined according to the positional information of the initial touching points of the touching operations and a preset region limitation rule.

In the above, the initial touching point can be the point that the player touches in the movement-controlling region for the first time, and the preset region limitation rule can be a preset rule that specifically limits the size of the region.

For example, the movement-controlling region is the left half region of the graphical user interface in the terminal. After a user touches the region for the first time, the initial touching point mentioned above can be obtained, and the position of the initial touching point on the interface can be obtained.

In some examples, the preset region limitation rule is determined according to a preset rule of a first radius and a preset rule of a second radius, where the first radius is a radius of the first controlling region, and the second radius is a radius of the second controlling region.

In some examples, if the first controlling region is in a shape of a circle, the first radius is the radius of the circle, the preset rule of the first radius is the length range of the first radius; if the second controlling region is the region outside a ring shape, the second radius is the radius of the outer ring of the ring shape, and the preset rule of the second radius is the length range of the second radius.

In some examples, the controlling regions and the adjusting region are determined according to a region corresponding to a moving-scope-auxiliary control of a moving control.

In some examples, the controlling regions and the adjusting region can be determined according to the region corresponding to the moving-scope-auxiliary control of the moving control, where the moving control can be a movable control provided at the fixed initial position in the movement-controlling region, the moving-scope-auxiliary control can be an auxiliary control used to delimit the movable scope of the moving control, and the specific sizes of the controlling regions and the adjusting region can be delimited according to the scope of the moving auxiliary control.

The corresponding relationships between the moving control in the movement-controlling region and the controlling regions, the adjusting region provided by the embodiments of the present disclosure are specifically explained below.

Figure 4:
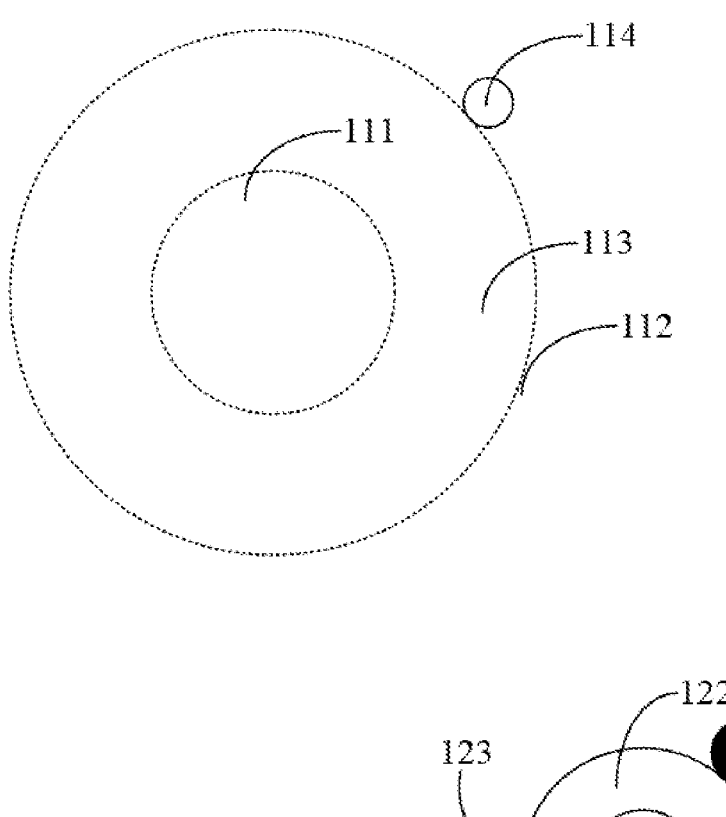
FIG. 4 is a schematic diagram of corresponding relationships between a moving control in a movement-controlling region and controlling region, an adjusting region in accordance with one or more embodiments of the present disclosure.

FIG. 4 is a schematic diagram of corresponding relationships between the moving control in the movement-controlling region and the controlling regions, the adjusting region. Referring to FIG. 4, the movement-controlling region includes a moving control 120. The moving control 120 includes a moving-joystick control 121, a moving-scope-auxiliary control and a scope adjusting control 122. The moving-joystick control 121 is located in the moving-scope-auxiliary control. The moving-joystick control 121 is configured to move according to the movement of the touching point of the touching operation, where the moving-scope-auxiliary control includes a first moving-scope-auxiliary control 123 and a second moving-scope-auxiliary control 124. The method further includes: maintaining the moving-joystick control to be located in the moving-scope-auxiliary control where the operating point of the touching operation is located before entering the adjusting region, in response to the touching operation applied to the adjusting region.

In some examples, the adjusting region and the controlling regions mentioned above can be specifically the regions that are displayed only when triggered by the player. The moving control can be a control that is fixedly displayed in the movement-controlling region, where the moving-joystick control 121, the moving-scope-auxiliary control and the scope adjusting control 122 can be specifically User Interface (UI) controls.

The control can be a control that is used to allow the player to visually observe, and the specific scope of the control can be determined through the position of the moving-joystick control 121 in the control.

For example, when the user triggers the initial touching point in the movement-controlling region, the controlling regions and the adjusting region can be determined according to the position of the initial touching point and the preset region limitation rule mentioned above, where the position of the initial touching point is the center of the circle of the first controlling region, and when the initial touching point moves, the moving-joystick control can be controlled to move correspondingly. For example, when the initial touching point moves to the left, the moving-joystick control can be controlled to move leftward, and when the initial touching point is located in the first controlling region, the moving-joystick control can be located in the scope of the first moving-scope-auxiliary control; and when the initial touching point is located in the second controlling region, the moving-joystick control can be located outside the scope of the second moving-scope-auxiliary control.

In some examples, the scope adjusting control 122 can be specifically used to adjust the sizes of the first moving-scope-auxiliary control 123 and the second moving-scope-auxiliary control 124.

In some examples, the step of maintaining the moving-joystick control to be located in the moving-scope-auxiliary control where the operating point of the touching operation is located before entering the adjusting region in response to the touching operation applied to the adjusting region includes: maintaining the moving-joystick control to be located in the moving-scope-auxiliary control, when the operating point of the touching operation is in the first controlling region before entering the adjusting region; and maintaining the moving joystick control to be located outside the second moving-scope-auxiliary control, when the operating point of the touching operation is in the second controlling region before entering the adjusting region.

In some examples, when the touching point enters the adjusting region from the first controlling region, the moving-joystick control can be maintained to be located in the first moving-scope-auxiliary control; and when the touching point enters the adjusting region from the second controlling region, the moving joystick control can be maintained to be located outside the moving-scope-auxiliary control.

Another specific implementation process of the game character moving state switching method provided by the embodiments of the present disclosure will be specifically described below.

Figure 5:
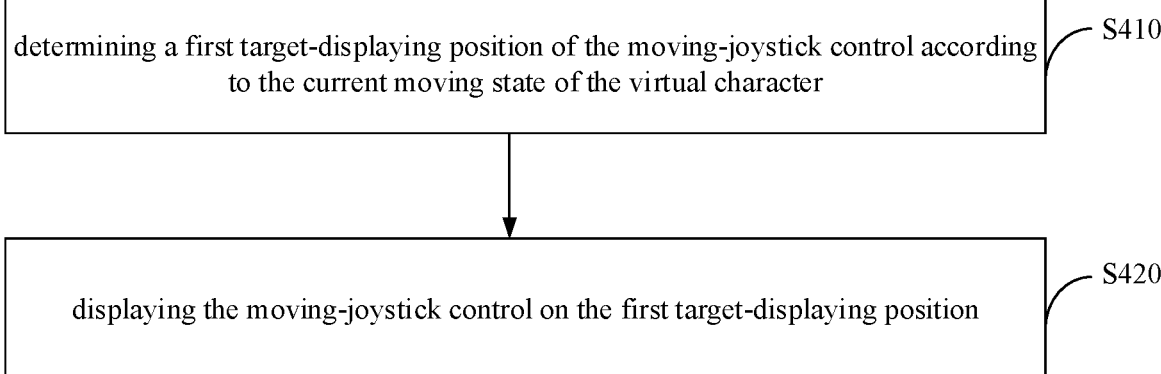
FIG. 5 is a schematic flow chart of the game character moving state switching method provided by one or more embodiments of the present disclosure.

FIG. 5 is the second schematic flow chart of the game character moving state switching method provided by the embodiments of the present disclosure. Referring to FIG. 5, the method further includes:

S410: determining a first target-displaying position of the moving-joystick control according to the current moving state of the virtual character.

In some examples, during a practical displaying process, the moving-joystick control can move in the moving space in the movement-controlling region, following the user's clicking or dragging.

In some examples, the first target-displaying position of the moving-joystick control can be specifically determined according to the current moving state of the virtual character. In the above, the current moving state can be the moving state after the moving state is controlled according to the touching operation, as mentioned before, that is, the moving state of the virtual character at the current time. The first target-displaying position can be one of a plurality of preset positions that are set in advance. It can be specifically set according to the practical demands, which is not limited specifically herein.

For example, if the current moving state is the first moving state, it can be displayed at an inscribed position of the first moving-scope-auxiliary control; and if the current moving state is the second moving state, it can be displayed at a circumscribed position (external connection position) of the second moving-scope-auxiliary control. It can be specifically set according to the practical demands, which is not limited specifically herein.

S420: displaying the moving-joystick control at the first target-displaying position.

In some examples, after determining the first target-displaying position, the moving-joystick control can be displayed at the first target-displaying position.

Another specific implementation process of the game character moving state switching method provided by the embodiments of the present disclosure will be specifically explained below.

FIG. 6 is the third schematic flow chart of the game character moving state switching method provided by the embodiments of the present disclosure. Referring to FIG. 6, the method further includes:

S510: determining a second target-displaying position of a target-prompting icon according to the current moving state of the virtual character.

In some examples, the second target-displaying position of the target-prompting icon can be determined according to the current moving state of the virtual character. In the above, the target-prompting icon can be specifically used to indicate a moving state corresponding to a sub-region in the movement-controlling region. For example, the state of a movement region corresponding to a sub-region in the movement-controlling region is the state of running, then it can be displayed through a target-prompting icon corresponding to the total setting of the region, where the target-prompting icon can be specifically pattern information, character information or pattern-character combination information, and so forth, for displaying the running action, which is not limited specifically herein, as long as it can realize the function of promoting mentioned above.

In some examples, the second target-displaying position is similar to the first target-displaying position, which can also be specifically set correspondingly according to the practical demands, which is not limited specifically herein.

S520: displaying the target-prompting icon at the second target-prompting position.

In some examples, after determining the second target-displaying position by the modes mentioned above, the target-prompting icon mentioned above can be displayed at the second target-displaying position.

In some examples, the determining the second target-displaying position of the target-prompting icon according to the current moving state of the virtual character at least includes one of the following steps: determining that the second target-displaying position of the target-prompting icon is at a third preset position of the second controlling region, when the current moving state of the virtual character is the first moving state; and determining that the second target-displaying position of the target-prompting icon is at a fourth preset position of the first controlling region, when the current moving state of the virtual character is the second moving state.

In some examples, taking the first moving state being the state of walking and the second moving state being the state of running as an example, if the current moving state of the virtual character is the state of walking, in order to enable the player to realize that the moving state corresponding to the second controlling region is the state of running, a corresponding target-prompting icon can be displayed at the third preset position in the second controlling region, where the third preset position can be a point on the outer boundary of the second controlling region, and in some examples, the preset position of the target-prompting icon may be displayed in a mode of using a circle or other preset shapes.

If the current moving state of the virtual character is the state of running, in order to enable the player to realize that the moving state corresponding to the first controlling region is the state of walking, a corresponding target-prompting icon can be displayed at the fourth preset position in the first controlling region, where the fourth preset position can be a point set inside the first controlling region, and in some examples, the preset position of the target-prompting icon may be displayed in a mode of using a circle or other preset shapes.

In some examples, the method mentioned above is only an example, the target-prompting icon can also be displayed in a corresponding position in the moving control, which is not limited herein.

In the game character moving state switching method provided by the embodiments of the present disclosure, the second target-displaying position of the target-prompting icon can be determined according to the current moving state of the virtual character, and the target-prompting icon is displayed on the second target-displaying position. In the above, by displaying the target-prompting icon at the second target-displaying position, the player can more clearly obtain the moving state corresponding to each of the subregions, so that the player can switch the moving state of the virtual character according to the practical demands, reducing the case of incorrect operation and improving the game operation experiences of the player.

Yet another specific implementation process of the game character moving state switching method provided by the embodiments of the present disclosure will be specifically described below.

FIG. 7 is the fourth schematic flow chart of the game character moving state switching method provided by the embodiments of the present disclosure. Referring to FIG. 7, the method further includes:

S610: determining the displaying mode of the moving-joystick control according to the current moving state of the virtual character.

In some examples, the displaying mode of the moving-joystick control can also be determined according to the current moving state of the virtual character. In the above, the displaying mode can be specifically referred to as the displaying format, for example, displaying brightness, displaying size, displaying color, displaying line and so forth. In practical operations, in order to enable the player to know that the moving states corresponding to different controlling regions are different, the moving-joystick control can be displayed in different displaying modes when the moving states are different.

For example, for the state of walking, the walking process is relatively slow, which may be at a lower speed, so it can be displayed in a preset displaying mode without prominent displaying. For the state of running, the running process is relatively faster than the walking process, so it can be displayed in a preset displaying mode with more prominent displaying than the walking process. The displaying mode is just an example, and it can be set correspondingly according to the practical demands, game scenarios provided and other factors, which is not limited specifically herein.

5620: displaying the moving-joystick control according to the displaying mode.

In some examples, after determining the displaying mode, the moving-joystick control can be displayed according to the displaying mode.

In some examples, the determining the displaying mode of the moving-joystick control according to the current moving state of the virtual character at least includes one of the following steps: determining that the displaying mode of the moving-joystick control is a first displaying mode, when the current moving state of the virtual character is the first moving state; and determining that the displaying mode of the moving-joystick control is a second displaying mode, when the current moving state of the virtual character is the second moving state.

In some examples, taking the first moving state being the state of walking and the second moving state being the state of running as an example, if the current moving state of the virtual character is the state of walking, the first displaying mode can be set as the preset size, color and brightness, and the moving-joystick control is displayed with the first displaying mode; and if the current moving state of the virtual character is the state of running, the second displaying mode can be set as a mode of larger size or a more vivid color or higher brightness, compared to that of the state of walking.

In the game character moving state switching method provided by the embodiments of the present disclosure, the displaying mode of the moving-joystick control can be determined according to the current moving state of the virtual character and the moving joystick control is displayed according to the displaying mode. In the above, by displaying the moving-joystick control with the displaying mode, it enables the player to more clearly know the difference between the current moving state and other moving states, which can improve the operation experiences of the player during the game process.

The apparatus, device and storage medium corresponding to the game character moving state switching method provided by the embodiments of the present disclosure are described below, and the specific implementation processes and technical effects are shown as mentioned above, which will not be repeated below.

Figure 8:
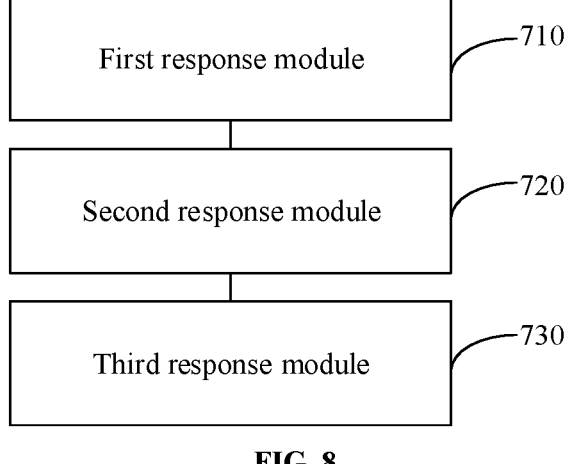
FIG. 8 is a schematic structural diagram of a game character moving state switching apparatus provided by one or more embodiments of the present disclosure.

FIG. 8 is a schematic structural diagram of a game character moving state switching apparatus provided by the embodiments of the present disclosure. Referring to FIG. 8, a game character moving state switching apparatus is provided, a graphical user interface is provided by a terminal, the graphical user interface is provided with a movement-controlling region, and the movement-controlling region is provided with controlling regions and an adjusting region, where the controlling region includes a first controlling region and at least one second controlling region, the first controlling region is provided in a first moving state, the second controlling region is provided in a second moving state, and the apparatus includes a first response module 710, a second response module 720 and a third response module 730.

The first response module 710 is configured for controlling a virtual character to move according to the first moving state corresponding to the first controlling region, in response to a touching operation applied to the first controlling region.

The second response module 720 is configured for controlling the virtual character to move according to the second moving state corresponding to the second controlling region, in response to a touching operation applied to the second controlling region.

The third response module 730 is configured for controlling the virtual character to move according to a moving state corresponding to the controlling region where an operating point of the touching operation is located before entering the adjusting region, in response to a touching operation applied to the adjusting region.

The apparatus mentioned above is used to execute the method provided by the previous embodiments, and its implementation principle and technical effect are similar, which will not be repeated herein.

These modules above can be configured as one or more integrated circuits to implement the method above, for example, one or more Application Specific Integrated Circuits (ASIC for short), or one or more microprocessors, or one or more Field Programmable Gate Array (FPGA for short) and so forth. For another example, when one module of the modules above is implemented in a form of a processing element scheduling program codes, the processing element can be a general-purpose processor, such as a Central Processing Unit (CPU for short) or other processors that can invoke the program codes. For another example, these modules can be integrated together and implemented as a form of system-on-a-chip (SOC for short).

Figure 9:
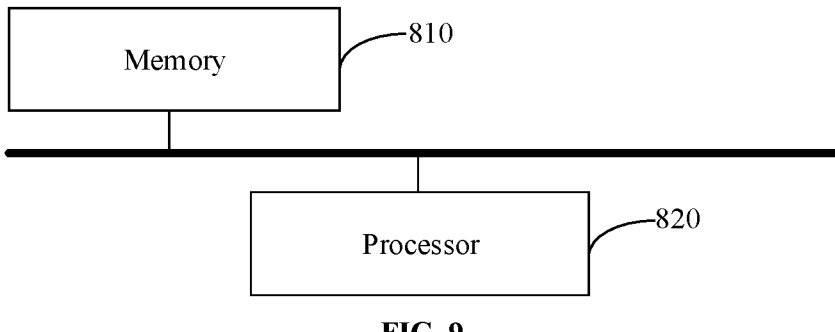
FIG. 9 is a schematic structural diagram of a computer device provided by one or more embodiments of the present disclosure.

FIG. 9 is a schematic structural diagram of a computer device provided by the embodiments of the present disclosure. Referring to FIG. 9, the computer device includes a memory 810 and a processor 820, where the memory 810 stores computer programs that are capable to be run on the processor 820, and when the processor 820 executes the computer programs, it implements the following steps:

controlling a virtual character to move according to the first moving state corresponding to the first controlling region, in response to a touching operation applied to the first controlling region;

controlling the virtual character to move according to the second moving state corresponding to the second controlling region, in response to a touching operation applied to the second controlling region; and controlling the virtual character to move according to a moving state corresponding to the controlling region where an operating point of a touching operation applied to the adjusting region is located before entering the adjusting region, in response to the touching operation applied to the adjusting region.

In some examples, the controlling regions and the adjusting region are determined according to the positional information of initial touching points of the touching operations and a preset region limitation rule.

In some examples, the preset region limitation rule is determined according to a preset rule of a first radius and a preset rule of a second radius, where the first radius is a radius of the first controlling region, and the second radius is a radius of the second controlling region.

In some examples, the controlling regions and the adjusting region are determined according to a region corresponding to a moving-scope-auxiliary control of a moving control.

In some examples, the step of controlling the virtual character to move according to the moving state corresponding to the controlling region where an operating point of a touching operation applied to the adjusting region is located before entering the adjusting region in response to the touching operation applied to the adjusting region at least includes one of the following steps:

controlling the virtual character to move in the first moving state, when the moving state corresponding to the controlling region where the operating point of the touching operation is located before entering the adjusting region is the first moving state; and controlling the virtual character to move in the second moving state, when the moving state corresponding to the controlling region where the operating point of the touching operation is located before entering the adjusting region is the second moving state.

In some examples, the movement-controlling region includes a moving control. The moving control includes a moving-joystick control, a moving-scope-auxiliary control, and a scope adjusting control. The moving-joystick control is located in the moving-scope-auxiliary control, and the moving-joystick control is configured to move according to the movement of a touching point of the touching operation, where the moving-scope-auxiliary control includes a first moving-scope-auxiliary control and a second moving-scope-auxiliary control. The method further includes: maintaining the moving-joystick control to be located in the moving-scope-auxiliary control where the operating point of the touching operation is located before entering the adjusting region, in response to the touching operation applied to the adjusting region.

In some examples, the step of maintaining the moving-joystick control to be located in the moving-scope-auxiliary control where the operating point of the touching operation is located before entering the adjusting region in response to the touching operation applied to the adjusting region includes: maintaining the moving-joystick control to be located in the first moving-scope-auxiliary control, when the operating point of the touching operation is in the first controlling region before entering the adjusting region; and maintaining the moving-joystick control to be located in the second moving-scope-auxiliary control, when the operating point of the touching operation is in the second controlling region before entering the adjusting region.

The specific implementation mode for the steps of the method in the present embodiment can be referred to the embodiments for the method mentioned above, which will not be repeated herein. In some examples, the computer device can be the terminal configured to display the graphical user interface during the processes mentioned previously, and the device can be a mobile phone, a computer, a tablet computer, a game machine and so forth, which is not limited specifically herein.

In embodiments of the present disclosure, a non-transitory computer-readable storage medium is provided, where the storage medium stores computer programs, and when the computer programs are executed by a processor, it implements the following steps:

controlling a virtual character to move according to the first moving state corresponding to the first controlling region, in response to a touching operation applied to the first controlling region;

controlling the virtual character to move according to the second moving state corresponding to the second controlling region, in response to a touching operation applied to the second controlling region; and controlling the virtual character to move according to a moving state corresponding to the controlling region where an operating point of a touching operation applied to the adjusting region is located before entering the adjusting region, in response to the touching operation applied to the adjusting region.

In some examples, the controlling regions and the adjusting region are determined according to the positional information of initial touching points of the touching operations and a preset region limitation rule.

In some examples, the preset region limitation rule is determined according to a preset rule of a first radius and a preset rule of a second radius, where the first radius is a radius of the first controlling region, and the second radius is a radius of the second controlling region.

In some examples, the controlling regions and the adjusting region are determined according to a region corresponding to a moving-scope-auxiliary control of a moving control.

In some examples, the step of controlling the virtual character to move according to the moving state corresponding to the controlling region where the operating point of the touching operation is located before entering the adjusting region in response to the touching operation applied to the adjusting region at least includes one of the following steps:

controlling the virtual character to move in the first moving state, when a moving state corresponding to the controlling region where the operating point of the touching operation is located before entering the adjusting region is the first moving state; and controlling the virtual character to move in the second moving state, when a moving state corresponding to the controlling region where the operating point of the touching operation is located before entering the adjusting region is the second moving state.

In some examples, the movement-controlling region includes a moving control. The moving control includes a moving-joystick control, a moving-scope-auxiliary control, and a scope adjusting control. The moving-joystick control is located in the moving-scope-auxiliary control, and the moving-joystick control is configured to move according to movement of a touching point of the touching operation, where the moving-scope-auxiliary control includes a first moving-scope-auxiliary control and a second moving-scope-auxiliary control. The method further includes: maintaining the moving-joystick control to be located outside the moving-scope-auxiliary control where the operating point of the touching operation is located before entering the adjusting region, in response to the touching operation applied to the adjusting region.

In some examples, the step of maintaining the moving-joystick control to be located in the moving-scope-auxiliary control where the operating point of the touching operation is located before entering the adjusting region in response to the touching operation applied to the adjusting region includes: maintaining the moving-joystick control to be located in the first moving-scope-auxiliary control, when the operating point of the touching operation is in the first controlling region before entering the adjusting region; and maintaining the moving joystick control to be located in the second moving-scope-auxiliary control, when the operating point of the touching operation is in the second controlling region before entering the adjusting region.

The specific implementation mode for the steps of the method in the present embodiment can be referred to the embodiments for the method mentioned above, which will not be repeated herein.

In several embodiments provided by the present invention, it shall be understood that the device and method disclosed may be realized by other modes. For example, the device embodiments described above are only schematic. For example, the division of units is only logical function division and may be implemented in another way in practice. For example, multiple units or components can be combined or integrated into another system, or some features can be ignored or not implemented. In another aspect, the coupling or direct coupling or communication connection between them shown or discussed may be an indirect coupling or communication connection through some interfaces, devices or units, which may be electrical, mechanical or in other form.

A unit described as a separated part may or may not be physically separated, and a component displayed as a unit may or may not be a physical unit, that is, it may be located in one place, or it may be distributed over multiple network units. Some or all of the units may be selected according to the actual needs to achieve the purpose of this embodiment scheme.

In addition, the individual functional units in the various embodiments of the disclosure may be integrated in a processing unit, or may be physically present individually, or two or more units may be integrated in one unit. The integrated unit can be realized either in the form of hardware or in the form of hardware plus software function unit.

The above integrated unit, in the form of a software functional unit, can be stored in a computer readable storage medium. The software functional unit is stored in a storage medium and includes several instructions to enable a computer device (which may be a personal computer, server, or network device, etc.) or processor to perform some of the steps of each embodiment method of the present disclosure. The aforementioned storage medium include: U disk, mobile hard disk, Read-Only Memory (ROM), Random Access Memory (RAM), magnetic disk or optical disk, and other media that can store program codes.

What is mentioned above is only the specific implementation method of this disclosure, but the scope of protection of this disclosure is not limited to this. Changes or replacements, that any technical personnel familiar with this technical field can easily think of within the scope disclosed in the present disclosure, should be covered by the scope of protection of this disclosure. Therefore, the scope of protection disclosed herein shall be subject to the scope of protection of the claim.

The foregoing are only some embodiments of this disclosure and are not intended to limit this disclosure. The present disclosure may have various changes and variations for persons skilled in this field. Any modification, equivalent replacement, improvement etc., made within the spirit and principles of this disclosure, shall be included in the scope of protection of this disclosure.

What is claimed is:

1. A game character moving state switching method, comprising:

controlling, by a terminal, a virtual character to move according to a first moving state corresponding to a first controlling region, in response to a touching operation applied to the first controlling region, wherein a graphical user interface is provided by the terminal, the graphical user interface comprises a movement-controlling region, the movement-controlling region comprises controlling regions and an adjusting region, the controlling regions comprise the first controlling region and at least one second controlling region, the first controlling region is provided in the first moving state, and the at least one second controlling region is provided in a second moving state;

controlling, by a terminal, the virtual character to move according to the second moving state corresponding to the at least one second controlling region, in response to a touching operation applied to the at least one second controlling region; and in response to the touching operation applied to the adjusting region, controlling the virtual character to move according to a moving state corresponding to one of the controlling regions where an operating point of the touching operation applied to the adjusting region is located before entering the adjusting region, wherein the first controlling region is a circular, elliptical, or arbitrary ring-shaped operable region, the adjusting region is a ring-shaped operable region provided around the first controlling region, and the at least one second controlling region is a ring-shaped operable region provided around the adjusting region.

2. The method according to claim 1, wherein the controlling regions and the adjusting region are determined according to positional information of initial touching points of the touching operations and a preset region limitation rule.

3. The method according to claim 2, wherein the preset region limitation rule is determined according to a preset rule of a first radius and a preset rule of a second radius, the first radius is a radius of the first controlling region, and the second radius is a radius of the at least one second controlling region.

4. The method according to claim 3, wherein the controlling regions and the adjusting region are determined according to a region corresponding to a moving-scope-auxiliary control of a moving control.

5. The method according to claim 1, wherein controlling the virtual character to move according to the moving state corresponding to one of the controlling regions where the operating point of the touching operation applied to the adjusting region is located before entering the adjusting region in response to the touching operation applied to the adjusting region comprises:

controlling the virtual character to move in the first moving state, in response to determining that the moving state corresponding to the controlling region where the operating point of the touching operation is located before entering the adjusting region is the first moving state; or controlling the virtual character to move in the second moving state, in response to determining that the moving state corresponding to the controlling region where the operating point of the touching operation is located before entering the adjusting region is the second moving state.

6. The method according to claim 1, further comprising:

maintaining a moving-joystick control to be located in a moving-scope-auxiliary control where the operating point of the touching operation is located before entering the adjusting region, in response to the touching operation applied to the adjusting region, wherein the movement-controlling region comprises a moving control, the moving control comprises the moving-joystick control, the moving-scope-auxiliary control and a scope adjusting control, the moving-joystick control is located in the moving-scope-auxiliary control, and the moving-joystick control is configured to move according to movement of a touching point of the touching operation, wherein the moving-scope-auxiliary control comprises a first moving-scope-auxiliary control and a second moving-scope-auxiliary control.

7. The method according to claim 6, wherein maintaining the moving-joystick control to be located in the moving-scope-auxiliary control where the operating point of the touching operation is located before entering the adjusting region in response to the touching operation applied to the adjusting region comprises:

maintaining the moving-joystick control to be located in the first moving-scope-auxiliary control, in response to determining that the operating point of the touching operation is in the first controlling region before entering the adjusting region; and maintaining the moving-joystick control to be located outside the second moving-scope-auxiliary control, in response to determining that the operating point of the touching operation is in the at least one second controlling region before entering the adjusting region.

8. A computer device, wherein the computer device comprises: a memory and a processor, the memory stores computer programs that are capable to be run on the processor, and the processor is configured to execute the computer programs, to implement steps of a game character moving state switching method, wherein the method comprises:

controlling a virtual character to move according to a first moving state corresponding to a first controlling region, in response to a touching operation applied to the first controlling region, wherein a graphical user interface is provided by the computer device, the graphical user interface comprises a movement-controlling region, the movement-controlling region comprises controlling regions and an adjusting region, the controlling regions comprise the first controlling region and at least one second controlling region, the first controlling region is provided in the first moving state, and the at least one second controlling region is provided in a second moving state;

controlling the virtual character to move according to the second moving state corresponding to the at least one second controlling region, in response to a touching operation applied to the at least one second controlling region; and in response to the touching operation applied to the adjusting region, controlling the virtual character to move according to a moving state corresponding to one of the controlling regions where an operating point of a touching operation applied to the adjusting region is located before entering the adjusting region, wherein the first controlling region is a circular, elliptical, or arbitrary ring-shaped operable region, the adjusting region is a ring-shaped operable region provided around the first controlling region, and the at least one second controlling region is a ring-shaped operable region provided around the adjusting region.

9. A non-transitory computer-readable storage medium, wherein the storage medium stores computer programs, and the computer programs, when executed by a processor, implement steps of a game character moving state switching method, wherein the method comprises:

controlling a virtual character to move according to a first moving state corresponding to a first controlling region, in response to a touching operation applied to the first controlling region, wherein a graphical user interface is provided by a terminal, the graphical user interface comprises a movement-controlling region, the movement-controlling region comprises controlling regions and an adjusting region, the controlling regions comprise the first controlling region and at least one second controlling region, the first controlling region is provided in the first moving state, and the at least one second controlling region is provided in a second moving state;

controlling the virtual character to move according to the second moving state corresponding to the at least one second controlling region, in response to a touching operation applied to the at least one second controlling region; and in response to the touching operation applied to the adjusting region, controlling the virtual character to move according to a moving state corresponding to one of the controlling regions where an operating point of a touching operation applied to the adjusting region is located before entering the adjusting region, wherein the first controlling region is a circular, elliptical, or arbitrary ring-shaped operable region, the adjusting region is a ring-shaped operable region provided around the first controlling region, and the at least one second controlling region is a ring-shaped operable region provided around the adjusting region.

10. The method according to claim 6, further comprising: determining a first target-displaying position of the moving-joystick control according to a current moving state of the virtual character, wherein the first target-displaying position is one of a plurality of preset positions; and displaying the moving-joystick control at the first target-displaying position.

11. The method according to claim 10, further comprising:

in response to determining that the current moving state is the first moving state, determining that the first target-displaying position is an inscribed position of the first moving-scope-auxiliary control; and in response to determining that the current moving state is the second moving state, determining that the first target-displaying position is an external connection position of the second moving-scope-auxiliary control.

12. The method according to claim 6, further comprising: determining a second target-displaying position of a target-prompting icon according to a current moving state of the virtual character; and displaying the target-prompting icon at the second target-displaying position.

13. The method according to claim 12, wherein the target-prompting icon is configured to indicate a moving state corresponding to a sub-region in the movement-controlling region.

14. The method according to claim 13, wherein the target-prompting icon comprises pattern information, character information or pattern-character combination information.

15. The method according to claim 12, wherein determining the second target-displaying position of the target-prompting icon according to the current moving state of the virtual character comprises:

determining that the second target-displaying position of the target-prompting icon is at a third preset position of the at least one second controlling region, in response to determining that the current moving state of the virtual character is the first moving state; or determining that the second target-displaying position of the target-prompting icon is at a fourth preset position of the first controlling region, in response to determining that the current moving state of the virtual character is the second moving state.

16. The method according to claim 15, wherein the third preset position is a point on an outer boundary of the at least one second controlling region, and the fourth preset position is a point set inside the first controlling region.

17. The method according to claim 6, further comprising: determining a displaying mode of the moving-joystick control according to a current moving state of the virtual character; and displaying the moving-joystick control according to the displaying mode.

18. The method according to claim 17, wherein determining the displaying mode of the moving-joystick control according to the current moving state of the virtual character comprises:

determining that the displaying mode of the moving-joystick control is a first displaying mode, in response to determining that the current moving state of the virtual character is the first moving state; or determining that the displaying mode of the moving-joystick control is a second displaying mode, in response to determining that the current moving state of the virtual character is the second moving state.

19. The method according to claim 1, wherein the adjusting region is provided between the first controlling region and the at least one second controlling region.

*     *     *     *     *